US008843124B2

(12) United States Patent
Fan et al.

(10) Patent No.: US 8,843,124 B2
(45) Date of Patent: Sep. 23, 2014

(54) METHOD, SYSTEM, SERVER AND TERMINAL FOR CONFIGURING SERVICE PARAMETERS

(75) Inventors: Shunan Fan, Shenzhen (CN); Jian Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 12/689,692

(22) Filed: Jan. 19, 2010

(65) Prior Publication Data

US 2010/0120410 A1 May 13, 2010

Related U.S. Application Data

(63) Continuation of application No. PCT/CN2008/071649, filed on Jul. 15, 2008.

(30) Foreign Application Priority Data

Jul. 24, 2007 (CN) .......................... 2007 1 0136337

(51) Int. Cl.
*H04M 3/00* (2006.01)
*H04M 3/42* (2006.01)

(52) U.S. Cl.
CPC ........ *H04M 3/4228* (2013.01); *H04M 3/42068* (2013.01); *H04M 2203/053* (2013.01); *H04M 3/42178* (2013.01); *H04M 2207/18* (2013.01); *H04M 3/42382* (2013.01)
USPC ...................................................... 455/419

(58) Field of Classification Search
CPC ......... H04W 8/18; H04W 8/22; H04W 92/08; H04W 48/18; H04W 4/00
See application file for complete search history.

(56) References Cited

U.S. PATENT DOCUMENTS 7,421,487 B1 * 9/2008 Peterson et al. ............... 709/223
2005/0130611 A1 * 6/2005 Lu et al. ........................ 455/130

(Continued)

FOREIGN PATENT DOCUMENTS

CN 1365580 A 8/2002
CN 1819700 A 8/2006

(Continued)

OTHER PUBLICATIONS

First Chinese Office Action dated (mailed) Mar. 24, 2011, issued in related Chinese Application No. 200710136337.5, Huawei Technologies Co., Ltd. (14 pgs.).

(Continued)

*Primary Examiner* — Patrick Edouard
*Assistant Examiner* — Shantell L Heiber
(74) *Attorney, Agent, or Firm* — Conley Rose, P.C.; Grant Rodolph; Nicholas K. Beaulieu

(57) ABSTRACT

A method, system, server and terminal for configuring service parameters are provided in the embodiment of the present invention. A parameter server sets the profile data that includes service parameters of operators; a terminal obtains the service parameters from the profile data through a parameter server and configures the service parameters by the received service parameters. The users are not required to manually configure the service parameters. Moreover, after the terminal has switched from one operator's service to another operator's service, the users are not required to either manually configure a new server's address or obtain the service parameters of another operator from a new server. So the present invention simplifies service parameter configuration and improves user experience.

19 Claims, 9 Drawing Sheets

(56) References Cited

U.S. PATENT DOCUMENTS

| | | | |
|---|---|---|---|
| 2005/0261016 A1* | 11/2005 | Patel et al. | 455/518 |
| 2007/0192445 A1* | 8/2007 | Lord et al. | 709/219 |
| 2008/0020755 A1* | 1/2008 | Liu et al. | 455/432.1 |
| 2008/0020765 A1* | 1/2008 | Black et al. | 455/435.2 |
| 2008/0020773 A1* | 1/2008 | Black et al. | 455/445 |
| 2008/0068995 A1* | 3/2008 | Skog | 370/230.1 |
| 2008/0132269 A1* | 6/2008 | Shen et al. | 455/550.1 |
| 2009/0270074 A1* | 10/2009 | Ergezinger et al. | 455/414.1 |

FOREIGN PATENT DOCUMENTS

| | | |
|---|---|---|
| CN | 1829344 A | 9/2006 |
| CN | 1863203 A | 11/2006 |
| CN | 1998255 A | 7/2007 |
| CN | 101068383 A | 11/2007 |
| CN | 101094472 A | 12/2007 |

OTHER PUBLICATIONS

Written Opinion of the International Searching Authority (translation) dated (mailed) Oct. 30, 2008, issued in related Application No. PCT/CN2008/071649, filed Jul. 15, 2008, Huawei Technologies Co., Ltd. (8 pgs.).

Second Chinese Office Action of related Chinese Application No. 200710136337.5 mailed Nov. 2, 2011.

Third Chinese Office Action mailed Jul. 3, 2012, issued in related Chinese Application No. 200710136337.5, (20 pages).

* cited by examiner

METHOD, SYSTEM, SERVER AND TERMINAL FOR CONFIGURING SERVICE PARAMETERS

CROSS-REFERENCE TO RELATED APPLICATIONS

This application is a continuation in part of International Application No. PCT/CN2008/071649, filed on Jul. 15, 2008, which claims priority to Chinese Patent Application No. 200710136337.5, filed on Jul. 24, 2007, both of which are hereby incorporated by reference in their entireties.

FIELD OF THE INVENTION

The present invention relates to the mobile communication technology, and in particular, to a method, system, server and terminal for configuring service parameters.

BACKGROUND

With the development of mobile communication technologies, users have gained access to a wide range of services, such as streaming media service, short messaging service (SMS), multimedia message service, and device management (DM). Before delivering a certain service, a terminal needs to obtain corresponding service parameters and configure these parameters, such as access parameters, proxy server's address, and service port number.

Different operators, networking modes, or even sub-brands of the same operator usually employ varied parameters, thus complicating the terminal's parameter configuration.

The prior art configures service parameters through the following two approaches:

Manual configuration: An operator provides a service parameter configuration manual. A user manually configures necessary service parameters on a terminal according to the parameter configuration manual, or calls the customer service hotline to manually configure the parameters as instructed.

DM server configuration: An operator sets up all the necessary service parameters on a DM server. A user triggers the DM server by sending a short message, surfing the Web, calling customer service hotline or requesting the DM server for service parameters in a business hall. The DM server returns parameter information to the terminal as requested. Then, the terminal obtains service parameters from the received information, and configures or modifies its service parameters according to the received parameters. As shown in FIG. 1, for example, DM server 1 saves corresponding service parameters from operator 1, and DM server 2 saves corresponding service parameters from operator 2. The terminal gains access to the service from operator 1 through a subscriber identity module (SIM) by configuring DM server 1's address and sending a request to DM server 1, and thus obtains the service parameters. The terminal also gains access to the service from operator 2 through another SIM by configuring DM server 2's address and sending a request to DM server 2, and thus obtains the service parameters.

During the implementing of the present invention, the inventor finds the following problems in the prior art:

In the first method, a user cannot easily configure the parameters according to manual or hotline instructions as this method is complex. In this regard, the method may adversely affect user experience.

In the second method, even though manual configuration is not necessarily needed, a user, however, must obtain DM server's address and manually configure it before requesting the DM server for service parameters. Moreover, service parameters from different operators, networking modes, and sub-brands of the same operator are set on different DM servers, and a user must manually configure a new DM server's address on a terminal when the terminal is switching from one operator's service to another. Thus, this method is complex and degrades user experience.

SUMMARY

A method, system, server and terminal for configuring service parameters are provided in an embodiment of the present invention to simplify service parameter configuration and improve user experience.

A method for configuring service parameters is provided in an embodiment of the present invention. This method includes:

obtaining service parameters from the profile data that includes service parameters of operators and is set in a parameter server; and configuring the service parameters for the terminal A method for configuring service parameters is provided in an embodiment of the present invention. This method includes:

obtaining, by the terminal, the service parameters from the profile data after the terminal is triggered; and configuring the service parameters for the terminal by using the received service parameters.

A system for configuring service parameters is provided in an embodiment of the present invention. This system includes:

a parameter server, adapted to save the profile data; and a terminal, adapted to configure service parameters by using the received parameters from the parameter server.

A server for configuring service parameters is provided in an embodiment of the present invention. This server includes:

a data memory module, adapted to save the profile data that is set and includes service parameters of operators; and a sending module, adapted to obtain the profile data from the data memory module and send the profile data.

A terminal for configuring service parameters is provided in an embodiment of the present invention. This terminal includes:

a transceiver module, adapted to receive the profile data that includes the service parameters of all the operators and provide the profile data;

a memory module, adapted to save the profile data provided by the transceiver module; and a configuration module, adapted to: configure the service parameters according to the profile data saved in the memory module.

This invention differs from the prior art as it configures profile data on the parameter servers. In this way, the terminal may obtain these parameters from the profile data and configures the parameters. An embodiment of the present invention removes the need for users to manually configure service parameters or a new server's address and obtain service parameters provided by another operator from the new server when the terminal switches from one operator's service to another. Therefore, the present invention simplifies service parameter configuration and improves user experience.

DETAILED DESCRIPTION

For clarity, the following reference drawings and implementation examples further illustrate the goal, solution, and advantages of the present invention.

A method for configuring service parameters is provided in an embodiment of the present invention. This method includes:

obtaining service parameters from the parameter server in which the profile data that includes service parameters of operators is set; and configuring service parameters for a terminal by using the received service parameters.

Wherein, service parameters are obtained from the parameter server through the following two approaches:

First, the terminal searches and obtains necessary service parameters from the parameter server.

Second, the terminal directly obtains and saves the profile data that includes service parameters of all the operators from the parameter server. If some service parameters must be configured, the terminal will search the saved profile data for necessary parameters.

In the first approach, the terminal must obtain service parameters from the parameter server to configure its parameters. This complicates implementation and burdens the parameter server. Therefore, the following embodiment takes the second approach as an example.

Figure 1:
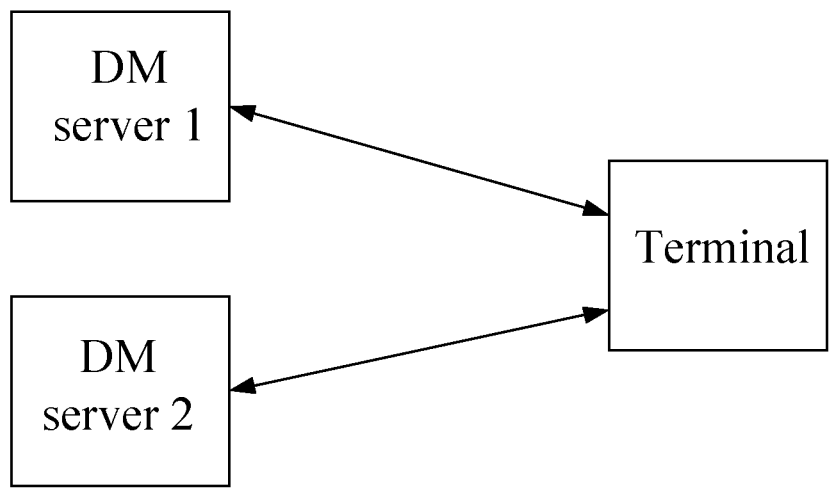
FIG. 1 is a structural diagram showing a system for configuring service parameters in the prior art.
Figure 2:
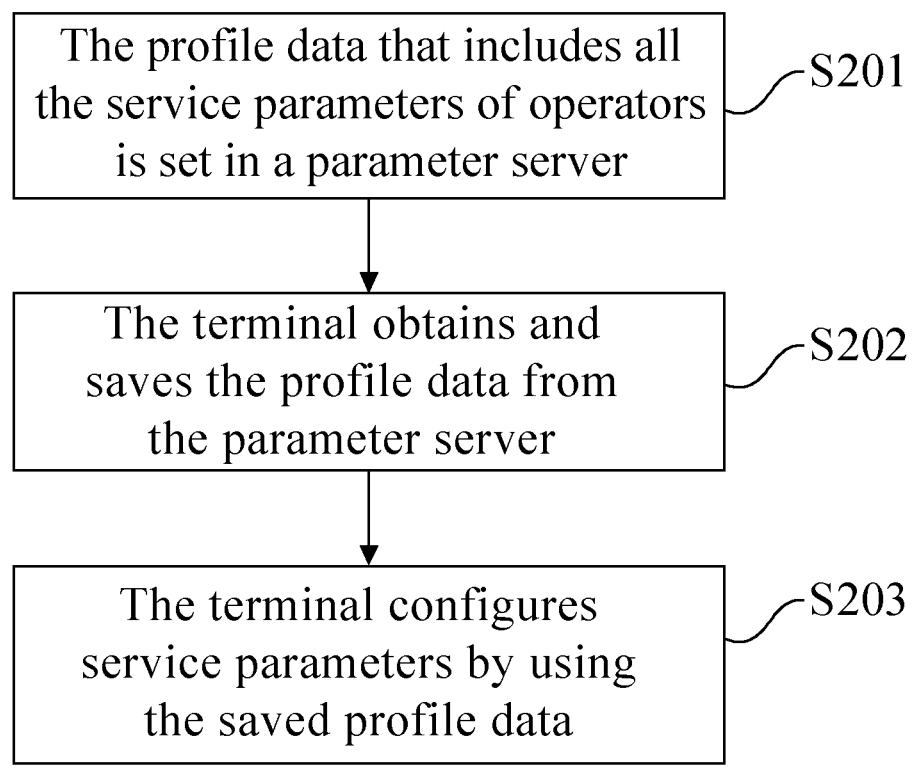
FIG. 2 is a flowchart of service parameter configuration according to an embodiment of the present invention.

The following embodiment specifies a method of configuring service parameters. As shown in FIG. 2, the method includes the following steps:

S201: The profile data that contains service parameters of all operators is set in a parameter server.

In this step, the general profile data can be set in a parameter server to provide data for the terminal. The profile data may come either from service parameters of all operators, from all operators that employ various networking modes, or from all sub-brands of all operators.

For example, Table 1 shows the streaming service parameters:

TABLE 1

| Item | Description |
| --- | --- |
| Operator | Operator name |
| Sub_Name | Sub-brand name |
| Network | Networking mode |
| Proxy_IPAdress | IP address of proxy gateway |
| Proxy_Port | Port number of proxy gateway |
| Timeout | Time limitation |
| Portal_URI | Uniform resource identifier |

Table 2 shows the MMS service parameters:

TABLE 2

| Item | Description |
| --- | --- |
| Operator | Operator name |
| Sub_Name | Sub-brand name |
| Network | Networking mode |
| MMS Center Address | MMS center address |
| PPP Connection | Network access point |
| Gateway Address | IP address of gateway for the wireless access protocol (WAP) of MMS |
| WAP Gateway Port | Port number |
| WAP Gateway User name | User name |
| WAP Gateway Password | Password |
| Connection type | Connection type |
| Network Access Point | Network access point |
| Validity | Validity period of information |
| Send_report | Send port on/off |
| Reading_report | Reading port on/off |
| Send_Limit | Send threshold on/off |
| Save_After Send | Save after send on/off |
| Send_visibility | Send visibility on/off |
| Send_dilivery_report | Send delivery port on/off |
| Send_reading_report | Send reading port on/off |
| Retrieval_Limit | Limitation for retrieval of the multimedia |
| Auto_Retrieval | Auto download multimedia Y/N |

Table 3 shows the DM service parameters:

TABLE 3

| Item | Description |
| --- | --- |
| Operator | Operator name |
| Sub_Name | Sub-brand name |
| Network | Networking mode |
| PPP Dial_Number | PPP access point |
| PPP User_Name | PPP user name |
| PPP Password | PPP address |
| Proxy_IP | WAP gateway address |
| PortalURL | URL |
| Proxy_Address | Proxy server address |
| Authen | Authentication |
| User_Name | User name |
| Password | Password |
| PortNbr | Port number |

Table 4 shows the browser service parameters:

TABLE 4

| Item | Description |
| --- | --- |
| Operator | Operator name |
| Sub_Name | Sub-brand name |
| Network | Networking mode |
| Server Address | URL address of DM server |

TABLE 4-continued

| Item | Description |
| --- | --- |
| Server Address type | Server address type |
| Server Address Port | Port number of DM server |
| AuthPref | Authentication parameters |
| ServerId | Server ID |
| ServerPW | Service password |
| UserName | User name |
| ClientPW | Password |
| ServerNonce | Nonce state of server |
| ClientNonce | Nonce state of client |
| PPP Connection | Connection parameters |
| ConRef | Connection parameters |
| Network Access Point | Network access point |

Table 5 shows the SMS service parameters:

TABLE 5

| Item | Description |
| --- | --- |
| Operator | Operator name |
| Sub_Name | Sub-brand name |
| Network | Networking mode |
| Message Center | IP address of message center |
| Status Report | Status report |
| Valid Period | Valid period of short message |
| Priority | Emergencies in normal interaction |
| Privacy | Unrestricted (Privacy class 0) Restricted (Privacy class 1) Confidential (Privacy class 2) Top secret (Privacy class 3) |
| Deferred Delivery Time | Deferred delivery time (absolute/relative) |

The parameter server may configure parameters according to operator's information and active services, and convert the parameters into a format accepted by the terminal. For example, the profile data formats, such as Extensible Markup Language (Schema), Session Description Protocol (SDP), and data structure, may be used. The Schema format defined by previous parameters in the table is detailed as follows:

```
<?xml version="1.0" encoding="UTF-8"?>
<!--W3C Schema generated by XMLSPY v5 rel. 4 U(http://www.xmlspy.com)-->
<xs:schema xmlns:xs="http://www.w3.org/2001/XMLSchema" elementFormDefault="qualified">
    <xs:element name="APN">
        <xs:complexType>
            <xs:simpleContent>
                <xs:extension base="xs:string">
                    <xs:attribute name="APN" type="xs:string" use="required"/>
                    <xs:attribute name="IP_Adress" type="xs:string" use="required"/>
                    <xs:attribute name="Primary_DNS" type="xs:string" use="required"/>
                    <xs:attribute name="Second_DNS" type="xs:string" use="required"/>
                    <xs:attribute name="Authen" use="required">
                        <xs:simpleType>
                            <xs:restriction base="xs:NMTOKEN">
                                <xs:enumeration value="None"/>
                                <xs:enumeration value="PAP"/>
                                <xs:enumeration value="CHAP"/>
                            </xs:restriction>
                        </xs:simpleType>
                    </xs:attribute>
                    <xs:attribute name="User_Name" type="xs:string" use="required"/>
                    <xs:attribute name="Password" type="xs:string" use="required"/>
                </xs:extension>
            </xs:simpleContent>
        </xs:complexType>
    </xs:element>
```

This format defines the parameters of Access Point Name (APN), including IP address, primary domain name server, secondary domain name server, and authentication information.

```
<xs:element name="Access_Parameter">
    <xs:complexType>
        <xs:choice>
            <xs:element ref="APN"/>
            <xs:element ref="PPP"/>
        </xs:choice>
    </xs:complexType>
</xs:element>
```

This format defines the parameters for access, including APN and Point to Point Protocol (PPP).

```
<xs:element name="NAP_Parameter">
    <xs:complexType>
        <xs:sequence>
            <xs:element ref="Access_Parameter"/>
            <xs:element ref="WAP"/>
        </xs:sequence>
    </xs:complexType>
</xs:element>
```

This format defines the parameters for network access point, including access parameters and wireless application protocol (WAP) gateway parameters.

```
<xs:element name="PPP">
    <xs:complexType>
        <xs:simpleContent>
            <xs:extension base="xs:string">
                <xs:attribute name="Dial_number" type="xs:string" use="required"/>
                <xs:attribute name="Authen" use="required">
                    <xs:simpleType>
                        <xs:restriction base="xs:NMTOKEN">
                            <xs:enumeration value="PAP"/>
```

```
            <xs:enumeration value="CHAP"/>
          </xs:restriction>
        </xs:simpleType>
      </xs:attribute>
    </xs:extension>
  </xs:simpleContent>
  </xs:complexType>
</xs:element>
```

This format defines the parameters for PPP's access, including necessary phone number and authentication information.

```
<xs:element name="WAP">
  <xs:complexType>
    <xs:attribute name="IP_Adress" type="xs:string"/>
    <xs:attribute name="Port" type="xs:string"/>
    <xs:attribute name="Authen">
      <xs:simpleType>
        <xs:restriction base="xs:NMTOKEN">
          <xs:enumeration value="None"/>
          <xs:enumeration value="PAP"/>
          <xs:enumeration value="CHAP"/>
        </xs:restriction>
      </xs:simpleType>
    </xs:attribute>
    <xs:attribute name="User_Name" type="xs:string"/>
    <xs:attribute name="Password" type="xs:string"/>
  </xs:complexType>
</xs:element>
```

This format defines WAP gateway parameters, including the necessary IP address, port number, and authentication information.

```
<xs:element name="Operator">
  <xs:complexType>
    <xs:attribute name="Oper_Name" type="xs:string" use="required"/>
```

```
      <xs:attribute name="Sub_Name" type="xs:string" use="optional"/>
      <xs:attribute name="Network" type="xs:string" use="required"/>
    </xs:complexType>
  </xs:element>
```

This format defines the parameters relating to operators, sub-brands and networking modes.

```
<xs:element name="Streaming">
  <xs:complexType>
    <xs:sequence>
      <xs:element ref="NAP_Parameter"/>
      <xs:element ref="Operator"/>
    </xs:sequence>
    <xs:attribute name="Proxy_IPAdress" type="xs:string" use="optional"/>
    <xs:attribute name="Proxy_Port" type="xs:long" use="optional"/>
    <xs:attribute name="Timeout" type="xs:long" use="optional"/>
    <xs:attribute name="Portal_URI" type="xs:anyURI" use="optional"/>
  </xs:complexType>
</xs:element>
```

This format defines streaming service parameters. The NAP parameters defined in the above-mentioned format is required for this format.

```
<xs:element name="DM">
  <xs:complexType>
    <xs:sequence>
      <xs:element ref="NAP_Parameter"/>
      <xs:element ref="Operator"/>
    </xs:sequence>
    <xs:attribute name="Server_Address" type="xs:anyURI" use="optional"/>
    <xs:attribute name="Server_Address_type" type="xs:string" use="optional"/>
    <xs:attribute name="ServerId" type="xs:string" use="optional"/>
    <xs:attribute name="ServerPW" type="xs:string" use="optional"/>
    <xs:attribute name="Services_Number" type="xs:string" use="optional"/>
    <xs:attribute name="UserName" type="xs:string" use="optional"/>
    <xs:attribute name="ClientPW" type="xs:string" use="optional"/>
    <xs:attribute name="ServerNonce" type="xs:string" use="optional"/>
    <xs:attribute name="ClientNonce" type="xs:string" use="optional"/>
    <xs:attribute name="PortNbr" type="xs:long" use="optional"/>
    <xs:attribute name="AuthPref" type="xs:string" use="optional"/>
    <xs:attribute name="ConRef" type="xs:string" use="optional"/>
  </xs:complexType>
</xs:element>
```

This format defines parameters needed for the DM service.

```
<xs:element name="Browser">
  <xs:complexType>
    <xs:sequence>
      <xs:element ref="NAP_Parameter"/>
```

-continued

```
        <xs:element ref="Operator"/>
    </xs:sequence>
    <xs:attribute name="Proxy_IP" type="xs:string" use="optional"/>
    <xs:attribute name="Proxy_Address" type="xs:string" use="optional"/>
    <xs:attribute name="Authen" type="xs:string" use="optional"/>
    <xs:attribute name="UserName" type="xs:string" use="optional"/>
    <xs:attribute name="Password" type="xs:string" use="optional"/>
    <xs:attribute name="PortalURI" type="xs:anyURI" use="optional"/>
   </xs:complexType>
</xs:element>
```

This format defines parameters needed for the browser service.

```
<xs:element name="SMS">
    <xs:complexType>
        <xs:sequence>
            <xs:element ref="Operator"/>
        </xs:sequence>
        <xs:attribute name="center_adress" type="xs:string"
            use="optional"/>
        <xs:attribute name="Validity" type="xs:string"
            use="optional"/>
        <xs:attribute name="status_report" type="xs:boolean"
            use="required"/>
    </xs:complexType>
</xs:element>
```

This format defines parameters needed for the SMS service.

```
<xs:element name="MMS">
    <xs:complexType>
        <xs:sequence>
            <xs:element ref="NAP_Parameter"/>
            <xs:element ref="Operator"/>
        </xs:sequence>
        <xs:attribute name="Center_Address" type="xs:string" use="required"/>
        <xs:attribute name="Connection_type" type="xs:string" use="optional"/>
        <xs:attribute name="Validity" type="xs:string" use="optional"/>
        <xs:attribute name="Send_report" type="xs:boolean" use="required"/>
        <xs:attribute name="Send_Limit" type="xs:long" use="optional"/>
        <xs:attribute name="Send_Visibility" type="xs:boolean" use="required"/>
        <xs:attribute name="Send_delivery_report" type="xs:boolean"
use="optional"/>
        <xs:attribute name="Retrieval_limit" type="xs:long" use="optional"/>
        <xs:attribute name="Auto_Retrieval" type="xs:boolean" use="required"/>
    </xs:complexType>
</xs:element>
</xs:schema>
```

This format defines MMS parameters.

In addition, when an operator changes its service parameters or issues a new service, a list server may update the service parameters in the profile data in case the terminal fails to obtain appropriate service parameters.

S202: The terminal obtains and saves profile data from a parameter server.

In this step, the terminal obtains profile data from a parameter server through the following two approaches.

Figure 3:
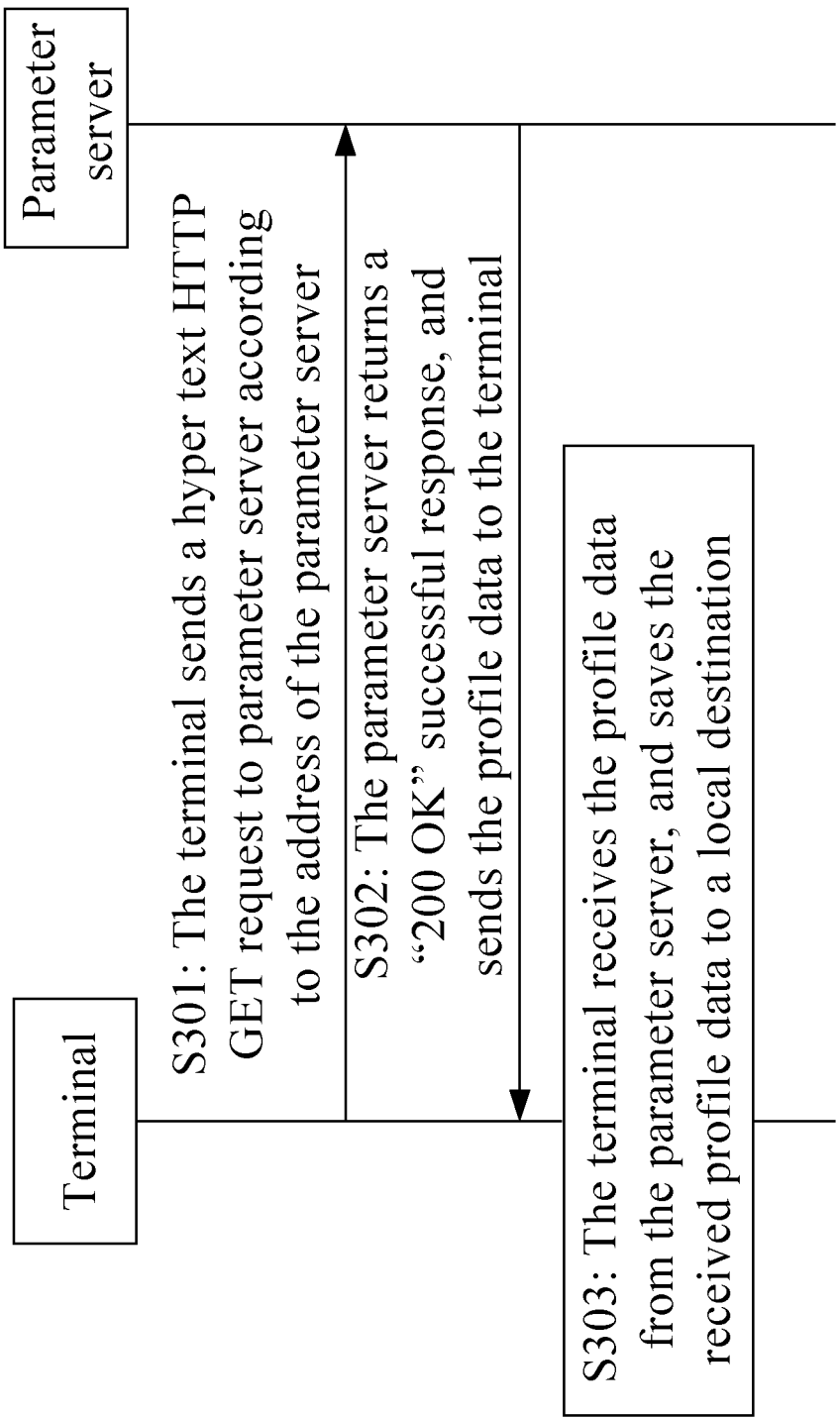
FIG. 3 is a flowchart of the method for obtaining profile data according to an embodiment of the present invention.

The first approach refers to that the terminal automatically sends a request to the parameter server, and the parameter server sends the profile data to the terminal as requested. As shown in FIG. 3, this approach includes the following steps.

S301: The terminal sends a Hyper Text Transfer Protocol Get (HTTP GET) request to the parameter server according to the address of the parameter server.

The terminal may preset or obtain the address of the parameter server and then send a HTTP GET request to this server.

The HTTP GET request, which is used in an embodiment of the present invention, is usually used to obtain information in safe mode, that is, to obtain information rather than modify it. The same profile data may be obtained when all terminals are sending the same requests to the parameter server. In addition, the terminal may also employ other GET requests, such as the Session Initiation Protocol (SIP) and the Transmission Control Protocol (TCP).

S302: The parameter server returns a "200 OK" response after receiving a HTTP GET request from the terminal, and sends profile data to the terminal.

S303: The terminal receives and saves the profile data sent by the parameter server.

In addition, this approach may also update the profile data for terminal. If a terminal fails to use service parameters while performing certain service, or the local profile data needs update when a new service is activated, the foresaid process may be used to obtain and update profile data.

Figure 4:
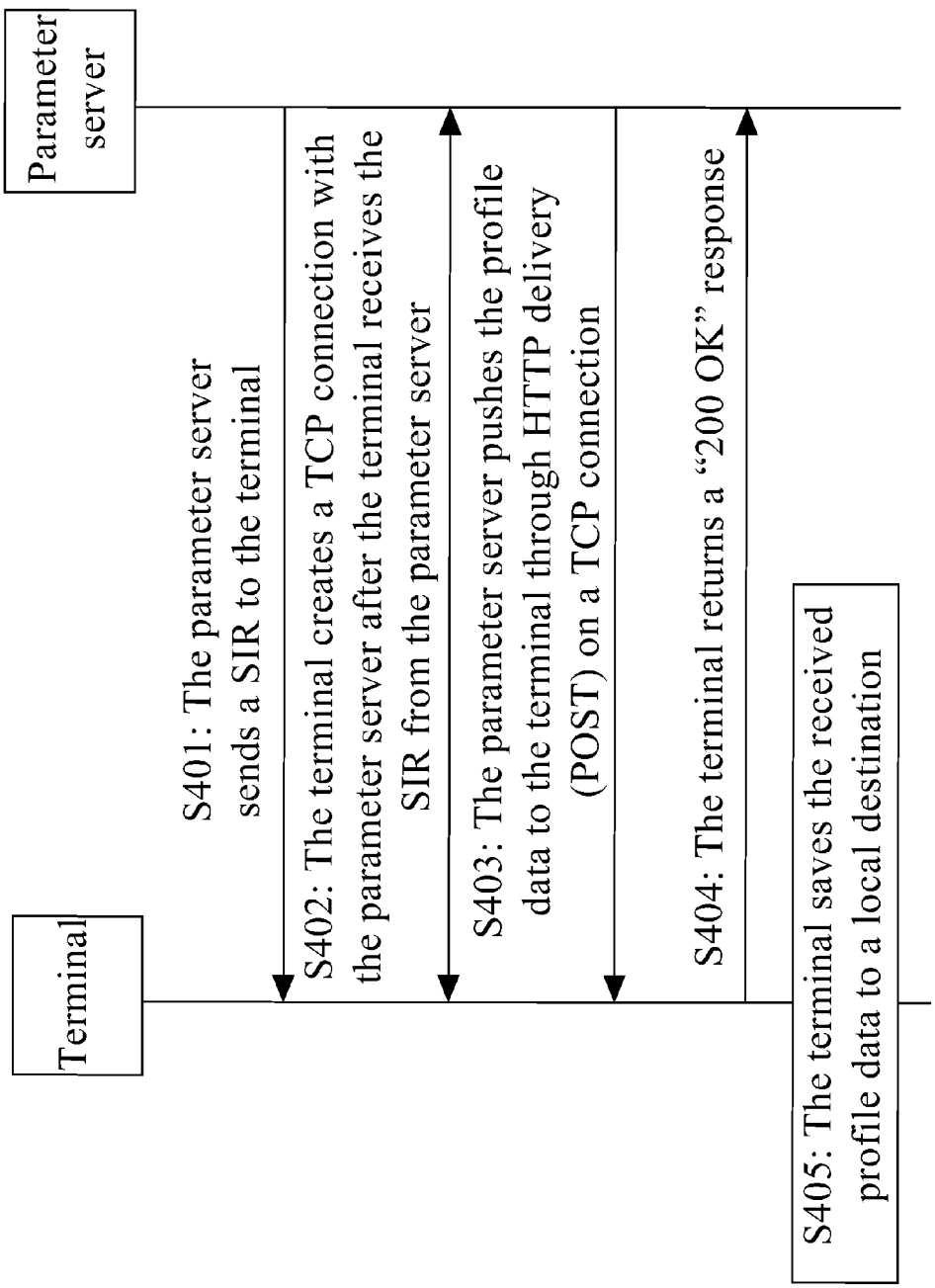
FIG. 4 is a flowchart of the method for obtaining profile data according to another embodiment of the present invention.

The second approach refers to that the parameter server automatically sends profile data to a terminal. As shown in FIG. 4, this approach includes the following steps:

S401: The parameter server sends a Session Initiation Request (SIR) to the terminal.

In this step, the parameter sends an SIR to terminal through broadcast to create an end-to-end TCP connection.

The SIR is used in HTTP to create a TCP connection.

S402: The terminal creates a TCP connection with parameter server after receiving the SIR from parameter server.

S403: The parameter server pushes the profile data to terminal by HTTP delivery (POST) through the TCP connection.

S404: The terminal returns a "200 OK" response after receiving profile data.

S405: The terminal saves the received profile data to a local destination.

Meanwhile, a parameter server may directly push the profile data to terminal without sending any request. For example, the parameter server may use a Push delivery process in the Push protocol.

Likewise, the second approach may also update the profile data for the terminal. After an operator launches a new service, a parameter server may employ the second approach to update the profile data and automatically send the updated profile data to the terminal. The terminal may update local profile data according to the received profile data.

S203: The terminal configures the local service parameters by the received profile data.

The terminal is a single-module terminal that uses only one subscriber identity card, such as SIM or Universal Subscriber Identity Module (USIM). The following description takes the SIM as an example. After installing SIMs from different operators, the terminal may automatically select corresponding service parameters from the profile data and configure the phone service parameters according to the information about the SIM's operator, networking mode, and sub-brand.

The terminal is a dual-module terminal or multi-module terminal that uses two or more subscriber identity modules simultaneously. The terminal may automatically select corresponding service parameters from the profile data and configure phone service parameters according to the current SIM and the information about the SIM's operator, networking mode, and sub-brand. In addition, the terminal may also configure corresponding service parameters of the current service without changing all the service parameters of the SIM's operator.

Figure 5:
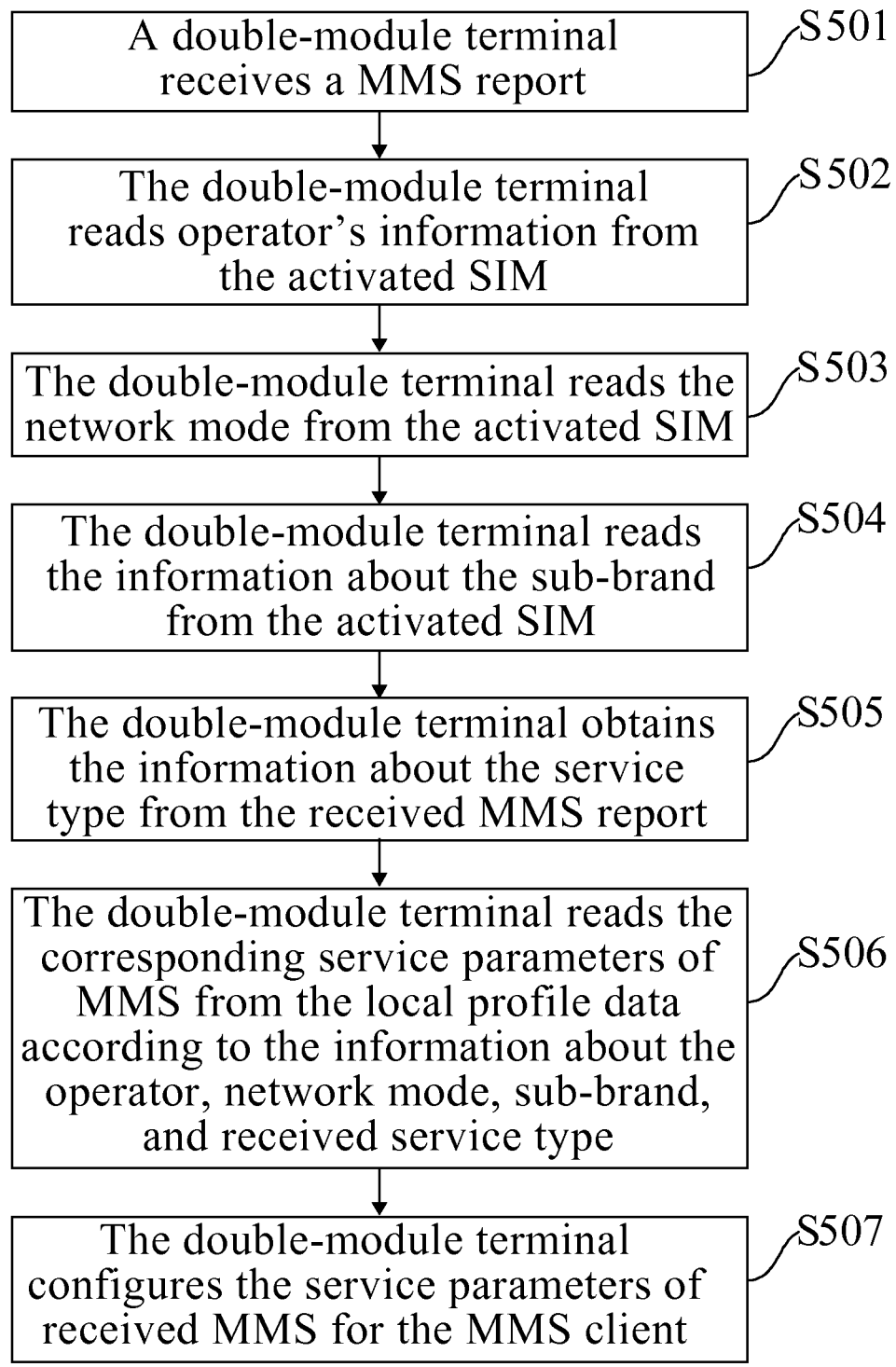
FIG. 5 is a flowchart of service parameter configuration while receiving MMS according to an embodiment of the present invention.

A dual-module terminal is taken as an example to detail this step. First, the dual-module terminal, which is receiving a multimedia message, exemplifies this step. FIG. 5 shows a flowchart of configuring service parameters while receiving an MMS in an embodiment of the present invention. See FIG. 5, the method includes the following steps:

S501: The dual-module terminal receives an MMS report.

The dual-module terminal will receive an MMS report if an MMS is available.

S502: The dual-module terminal reads operator's information in the activated SIM.

After receiving an MMS report, the dual-module terminal automatically activates one of the SIMs. The activated SIM can read the received MMS service. That is, this SIM may read the related MMS information such as information about the operator, networking mode, and sub-brand.

Figure 6:
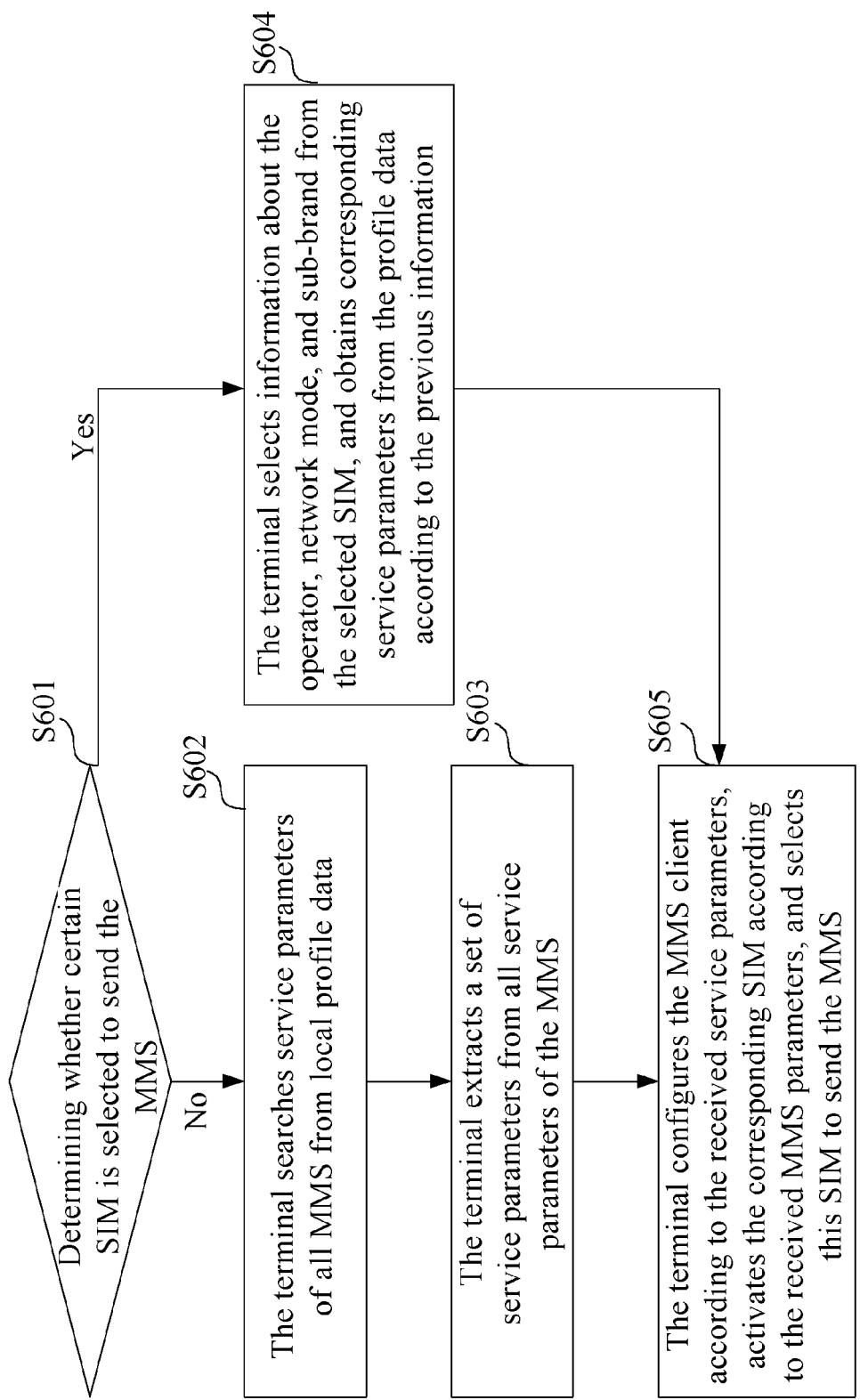
FIG. 6 is a flowchart of service parameter configuration while sending MMS according to an embodiment of the present invention.

FIG. 6 shows the data structure of a SIM. The International Mobile Subscriber Identification Number (IMSI) includes a Mobile Country Code (MCC) and a Mobile Network Code (MNC). The MCC includes three digit numbers, for example, 460 stands for China. The MNC includes two digit numbers, for example, 01 represents the China Unicom, 00 and 02 indicates the China Mobile. Therefore, the IMSI includes the operator's information.

TABLE 6

| Item | Description | Length |
|---|---|---|
| 6F05 | Language selection | 4 |
| 6F07 | IMSI | 9 |
| 6F20 | Kc, n | 9 |
| 6F30 | Public land mobile network selector (PLMN Selector) | 42 |
| 6F31 | HPLMN search | 1 |
| 6F38 | Service table | 4 |
| 6F45 | Cell broad message ID | 8 |
| 6F46 | Service provider name | 17 |

TABLE 6-continued

| Item | Description | Length |
|---|---|---|
| 6F74 | Broadcast control channel information (BCCH Information) | 16 |
| 6F78 | Access control | 2 |
| 6F7B | Forbidden PLMN | 12 |
| 6F7E | TMSI LAI | 11 |
| 6FAD | Admin data | 3 |
| 6FAE | Phase identify | 2 |

S503: The dual-module terminal reads the information about the networking mode from the activated SIM.

The SIM activated by the current MMS service may also read the networking mode of the MMS.

This step is necessary if an operator provides several networking modes, and is not necessary if an operator supports only one networking mode.

S504: The dual-module terminal reads the information about the sub-brand from the activated SIM.

This step is necessary if an operator has several sub-brands, and is not necessary if an operator has only one sub-brand.

Steps S502-S504 are omitted as they involve the processes of reading the information about the operator, networking mode, and sub-brand, which are available in the prior art.

Before implementing step S504, it is recommended that it may be determined whether service parameters of an operator's MMS under certain networking mode in the profile data are the same or not; and if yes, the information the sub-brand is not needed; otherwise, the information about the sub-brand is read.

S505: The dual-module terminal obtains the information about the service type from the received MMS report.

It is indicated from the MMS report that the MMS service needs parameter configuration.

S506: The dual-module terminal reads corresponding service parameters of the MMS from the local profile data according to the information about the operator, networking mode, sub-brand, and received service type.

S507: The dual-module terminal configures these parameters for its MMS client through the MMS service parameters.

The dual-module terminal, which sends an MMS, is taken to firstly exemplify this step. FIG. 6 shows a flowchart of configuring service parameters while sending the MMS in an embodiment of the present invention. The method includes:

S601: It is determining whether a given SIM is selected to send MMS or not; if not, the process proceeds to step S602; if yes, the process proceeds to step S604.

S602: The terminal searches all MMSs' service parameters from the local profile data.

S603: The terminal obtains a group of MMS service parameters. Then, the process proceeds to step S605.

Multiple groups of MMS service parameters may exist in the profile data, and they may be related to different operators, networking modes or sub-brands. If the profile data has service parameters of only one group of MMS, the parameters in this group can be selected.

S604: The terminal reads the information about the operator, networking mode, and sub-brand from the activated SIM, and obtains corresponding service parameters from the profile data.

S605: The terminal configures these parameters for the MMS client according to the obtained parameters, activates corresponding SIM according to the received MMS parameters, and uses this SIM to send MMS.

Figure 7:
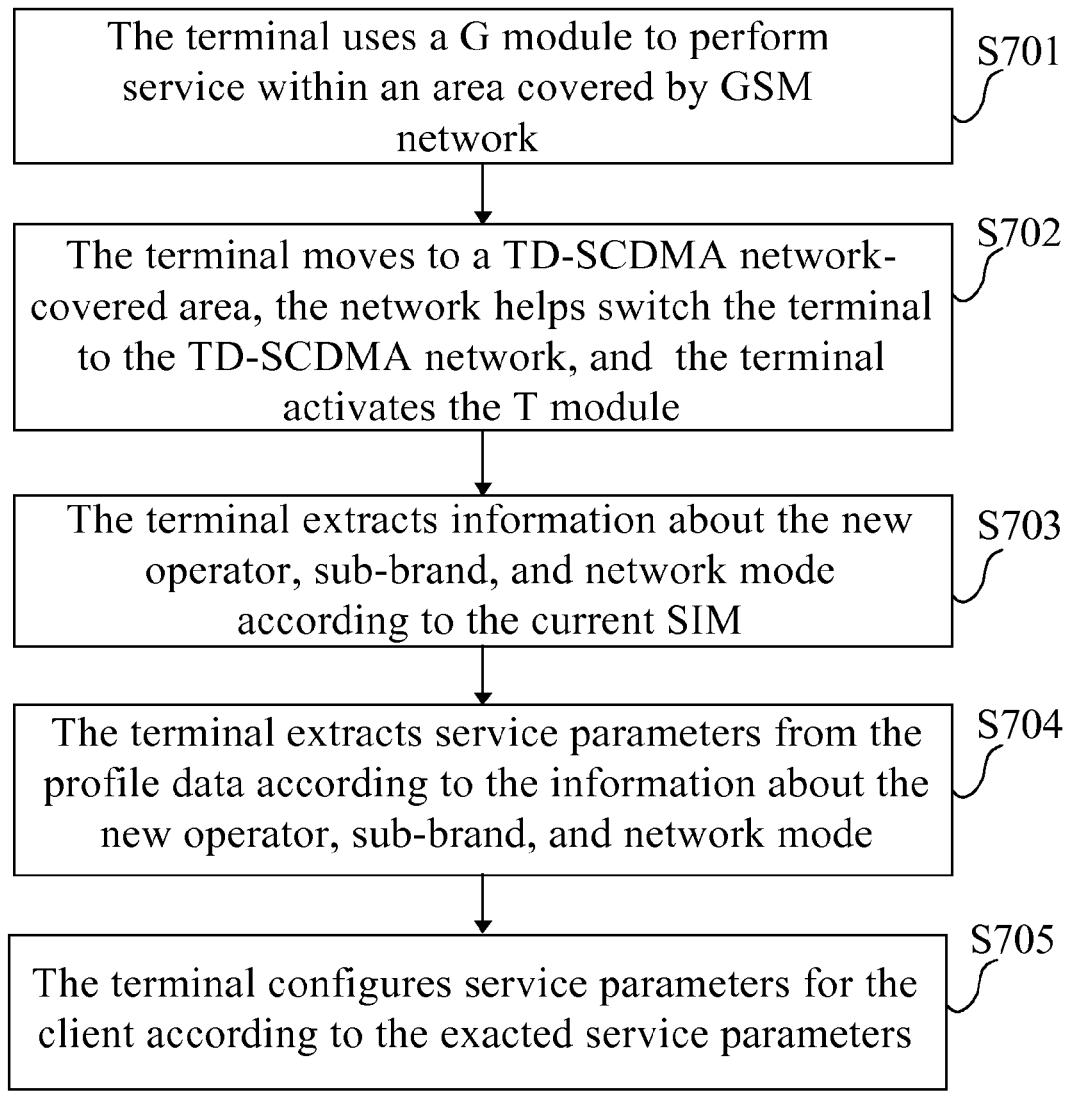
FIG. 7 is a flowchart of service parameter configuration while switching between networking modes according to an embodiment of the present invention.

In addition, the multi-module terminal may be switched among different networks, and one operator may support various networking modes. Moreover, given the same operator and service type, the service parameters may not be the same in different networking modes. So when the terminal is switched from one networking mode to another, it must be capable of reading and automatically changing the corresponding parameter configuration in profile data according to the received information about the operator, sub-brand, and networking mode, thus ensuring the normal service operation. The following embodiment describes the method for configuring service parameters when a terminal is switched between different networking modes. Assuming that all operators support both the Time Division-Synchronous Code Division Multiple Access (TD-SCDMA) and the Global System For Mobile Communications (GSM) networks, that the terminal is moving along the edge of an area covered by both TD-SCDMA and GSM networks, and that the networking modes need to be switched, the terminal will search related parameters from the profile data and implement parameter reconfiguration according to the information about the current networking mode. As shown in FIG. 7. The method includes the following steps:

S701: The terminal uses a G module to implement service within an area covered by the GSM network.

S702: The terminal moves to an area covered by the TD-SCDMA network, the network side switches the terminal to the TD-SCDMA networking mode, and the terminal activates a T module.

In this step, the terminal moves along the edge of an area covered by TD-SCDMA and GSM networks. When the signal of the GSM network reduces to certain threshold value, the network can switch the terminal to the TD-SCDMA network to ensure normal operation. This part is omitted as it is available in the prior art.

Wherein a G module serves as the SIM under the GSM network; and a T module serves as the SIM under the TD-SCDMA network. The terminal may switch between the SIMs according to different networking modes.

S703: The terminal obtains the information about a new operator, sub-brand, and networking mode according to the current SIM.

S704: The terminal obtains service parameters from the profile data according to the information about the new operator, sub-brand, and networking mode.

In this step, a terminal may extract the service parameters of all the services of the operator, sub-brand, and networking mode, and also the service parameters of the current service of the operator, sub-brand, and networking mode.

S705: The terminal configures these parameters for the client according to the obtained service parameters.

Figure 8:
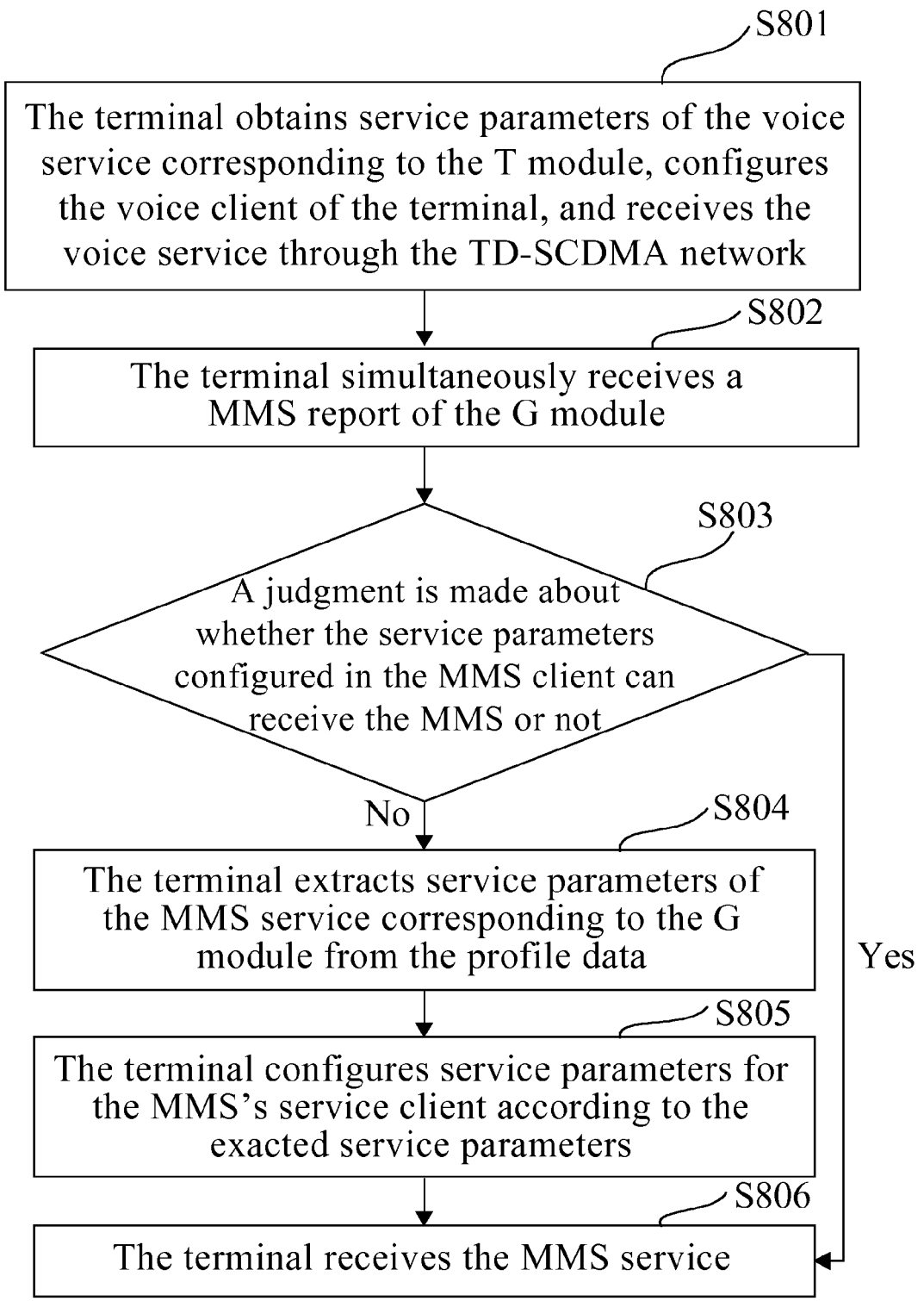
FIG. 8 is a flowchart of a method for simultaneously receiving service parameters in two networking modes according to an embodiment of the present invention.

In addition, a multi-module terminal may also receive concurrent services under different networking modes. For example, different services can configure different parameters when the concurrent services from a TD-SCDMA network and a GSM network are emerging simultaneously. FIG. 8 shows the flowchart to illustrate concurrent services. In this embodiment, assuming that a terminal is performing voice service through a TD-SCDMA network by T module and receiving MMS service from a GSM network by G module, the method includes the following steps as shown in FIG. 8.

S801: The terminal obtains the voice service parameters corresponding to T module, configures these parameters for terminal's voice client, and receives voice services from a TD-SCDMA network.

While choosing a T module to implement voice service, the terminal may configure the voice service parameter through the following two approaches: configuring other service parameters according to the T module parameters, or not configuring other service parameters.

S802: The terminal simultaneously receives an MMS report from the G module.

S803: It is determined whether the service parameters in a MMS client can receive MMSs; if not, the process proceeds to step S804; otherwise, the process proceeds to step S806.

In step S801, after configuring service parameters of the voice service corresponding to T module, the terminal continues to configure service parameters for other services corresponding to T module. In this way, the parameters configured in the MMS client cannot receive this MMS.

S804: The terminal obtains service parameters of the MMS service corresponding to G module from the profile data.

S805: The terminal configures service parameters for the MMS service client according to the obtained service parameters.

S806: The terminal receives the MMS service.

Figure 9:
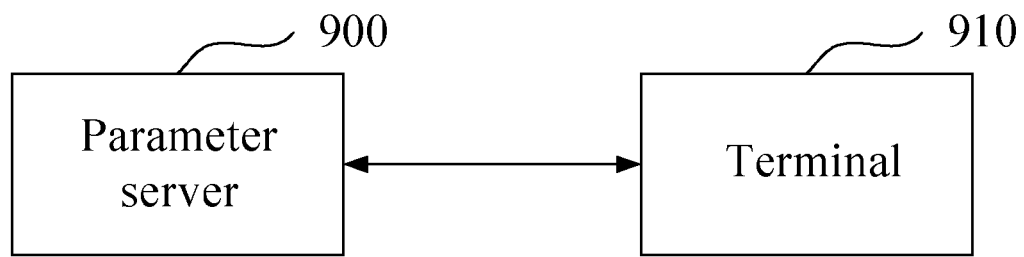
FIG. 9 is a constitution structural diagram showing a system for configuring service parameters according to an embodiment of the present invention.

The system for configuring service parameters is illustrated in an embodiment of the present invention, as shown in FIG. 9. This system includes a parameter server 900 and a terminal 910.

The parameter server 900 is adapted to: save the profile data.

The terminal 910 is adapted to obtain service parameters from the parameter server 900, and configure the service parameters by using the received service parameters.

The parameter server 900 is further adapted to send the set profile data to the terminal 910.

The terminal 910 is further adapted to receive the profile data from the parameter server 900, and save the received profile data.

Figure 10:
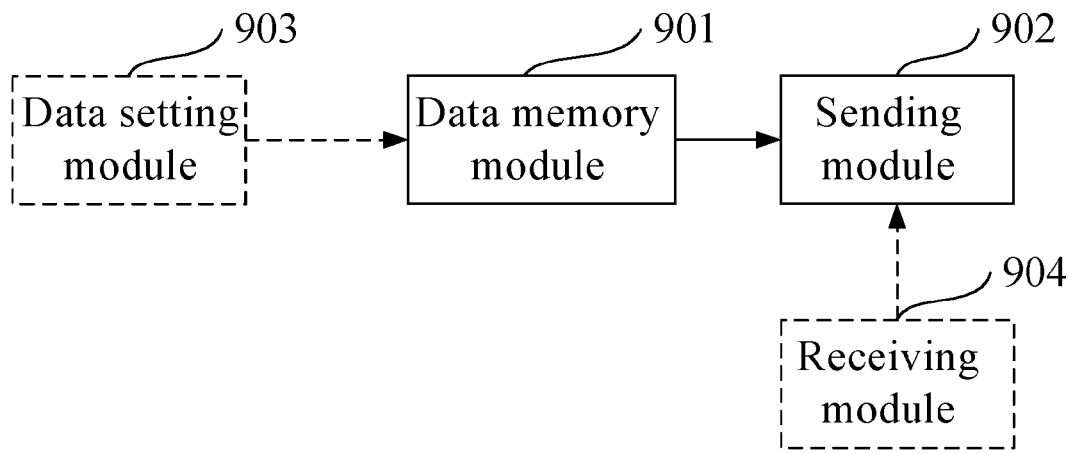
FIG. 10 is a constitution structural diagram showing a server for configuring service parameters according to an embodiment of the present invention.

Wherein, the structure of the parameter server 900 is shown in FIG. 10. The parameter server 900 further includes: a data memory module 901 and a sending module 902.

The data memory module 901 is adapted to save the profile data.

The sending module 902 is adapted to obtain the profile data from the data memory module 901, and send the profile data.

The parameter server 900 further includes:

a data setting module 906, adapted to set the service parameters of operators into the profile data, and provide the data memory module 901 with the profile data.

The parameter server 900 further includes a receiving module 904, adapted to: receive requests, and trigger the sending module 902 to send the profile data after receiving a request.

Figure 11:
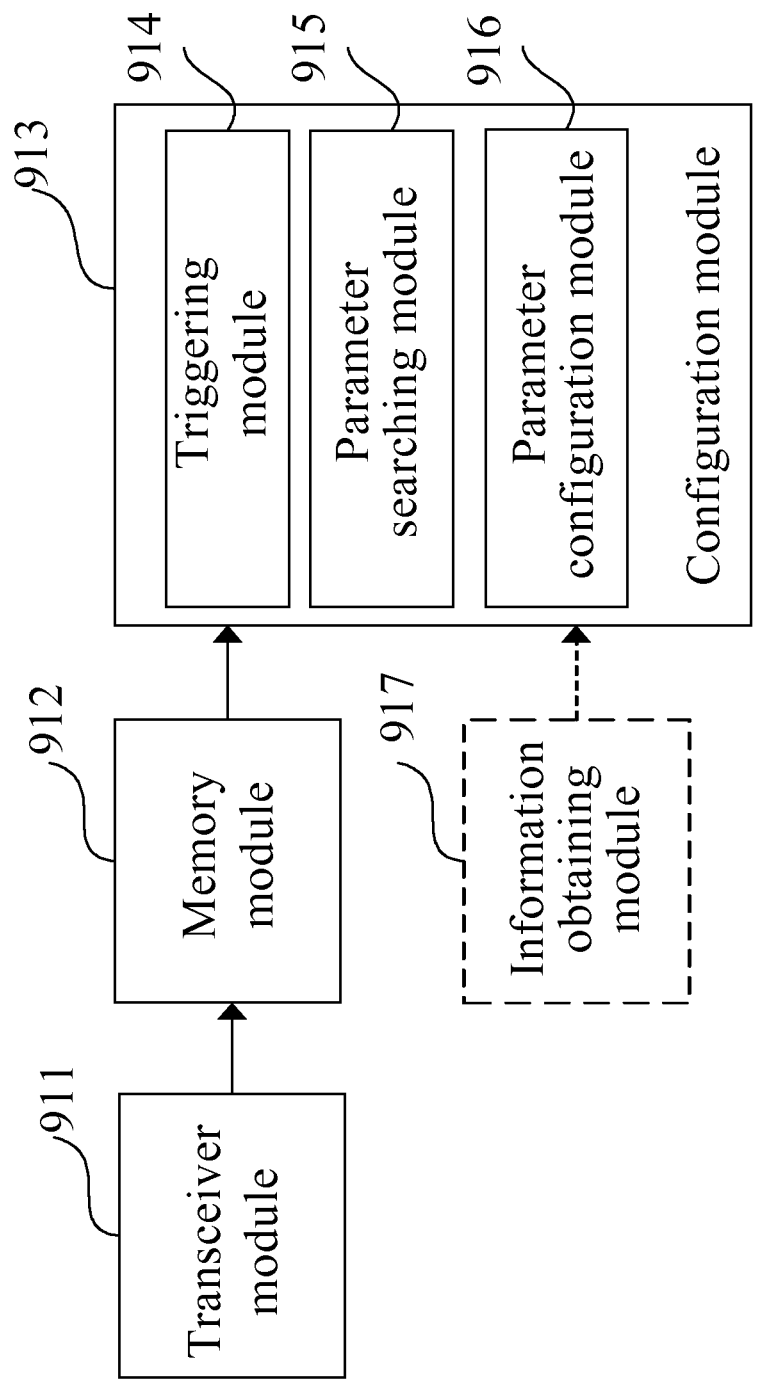
FIG. 11 is a constitution structural diagram showing a terminal for configuring service parameters according to an embodiment of the present invention.

FIG. 11 shows the terminal 910's structure according to an embodiment of the present invention. As shown in FIG. 11, the terminal 910 further includes: a transceiver module 911, a memory module 912, and a configuration module 913.

The transceiver module 911 is adapted to receive the profile data, and send the profile data to memory module 912.

The memory module 912 is adapted to save the profile data provided by transceiver module 911.

The configuration module 913 is adapted to configure the service parameters according to the profile data in memory module 912.

The transceiver module 911 is further adapted to request the profile data from the parameter server.

Wherein, the configuration module 913 includes: a triggering module 914, a parameter searching module 915, and a parameter configuration module 916.

The triggering module 914 is adapted to trigger the parameter searching module 915 when the terminal needs to perform services, or switch between SIMs, or switch networking modes.

The parameter searching module 915 is adapted to find out service parameters from the memory module 912 after being triggered, and send the service parameters to parameter configuration module 916.

The parameter configuration module 916 is adapted to obtain the service parameters from parameter search server 915, and configure the service parameters by using the received service parameters.

The terminal 910 further includes an information obtaining module 917, adapted to: read operator's information from the SIM, and send the operator's information to configuration module 913.

The configuration module 913 is further adapted to receive operator's information from the information obtaining module 917, and search the memory module 912 for service parameters according to the operator's information.

The earlier section indicates that an embodiment of the present invention may use the parameter server to save the profile data; the terminal may obtain service parameters from the profile data, and configure its parameters through the received service parameters. The users are not required to manually configure the service parameters. Moreover, after the terminal has switched from one operator's service to another operator's service, the users are not required to either manually configure a new server's address or obtain the service parameters of another operator from a new server. In this way, the present invention helps simplify service parameter configuration and improve user experience.

Dynamic service parameter selection and configuration may also be implemented according to the information about the operator, networking mode, sub-brand, and service type after the terminal is triggered by performing services, or switching between SIMs or networking modes. This embodiment helps ensure the normal and smooth service use.

In addition, the profile data from a parameter server can be updated if operator's service information changes or increases, and be automatically sent to the terminal. Optionally, if necessary, the terminal may automatically send a request for updating the profile data to the parameter server, and obtain the updated profile data, thus ensuring the normal use of a new or the service with changed service parameters.

A method for configuring service parameters, includes:
obtaining service parameters after a terminal is triggered; and
configuring service parameters to other terminal by using the obtained service parameters.
configuring service parameters to other terminal by using the obtained service parameters includes:
sending the service parameters to other terminal according to target address information, information provided by the operator, information in operators' networking modes, or information of operator's sub-brands.

Other terminal may be a camera, fixed terminal, phone, mobile phone and other electronics.

The preceding embodiments are intended to illustrate but not to limit the scope of the present invention. The invention is intended to cover all the modifications, equivalent replacements, and improvements without departing from the spirit and principles of the invention.

What is claimed is:

1. A method for configuring service parameters of a terminal, comprising:
storing multiple sets of service parameters to profile data in the terminal, wherein the multiple sets of service parameters correspond to multiple services;
triggering the terminal by performing one of the multiple services;
obtaining, by the terminal, one of the multiple sets of service parameters from the profile data that contain the multiple sets of service parameters after the terminal is triggered, wherein the terminal obtains the one of the multiple sets of service parameters by selecting the one of the multiple sets of service parameters from the profile data stored in the terminal according to an indication of the one of the multiple services to be performed, wherein the terminal comprises multiple subscriber identity cards, wherein the terminal utilizes one of the multiple subscriber identity cards that corresponds to the selected one of the multiple sets of service parameters, and wherein the multiple sets of service parameters comprise streaming service parameters, multimedia messaging service (MMS) parameters, device management (DM) parameters, browser service parameters, and short message service (SMS) parameters; and
configuring, by the terminal, the service parameters of the terminal by using the obtained one of the multiple sets of service parameters from the one of the multiple subscriber identity cards,
wherein the terminal is configured to automatically select the one of the multiple sets of service parameters according to an operator and a networking mode of the one of the multiple services to be performed,
wherein when concurrent services are received by the terminal with a multi-module under different networking modes the terminal is further configured to determine whether a client with current service parameters has an ability to support a new service,
wherein the concurrent services comprise a current service and the new service, and
wherein the new service is received by the client based on a result of the determination.

2. The method for configuring service parameters according to claim 1, wherein the multiple sets of service parameters comprise service parameter data, wherein the service parameter data is obtained from a parameter server, wherein the service parameter data is stored to the profile data in the terminal.

3. The method for configuring service parameters according to claim 2, wherein the profile data comprises service parameters obtained from operators' networking modes, service parameters obtained from operators' sub-brands, or service parameters obtained from operators' service types, and wherein configuring, by the terminal, the service parameters of the terminal comprises changing a portion but not all of the service parameters of the terminal.

4. The method for configuring service parameters according to claim 1, further comprising:
searching, by the terminal, necessary service parameters from profile data in the parameter server;
obtaining the necessary service parameters from the parameter server, and
wherein the terminal searches the profile data in the parameter server based at least in part on an indication that the profile data in the parameter server has changed.

5. The method for configuring service parameters according to claim 4, wherein obtaining the necessary service parameters from the parameter server comprises:

sending, by the terminal, a request to the parameter server, and receiving from the parameter server the profile data after the terminal sends the request to the parameter server; or receiving, by the terminal, a push message from the parameter server that includes the necessary service parameters.

6. The method for configuring service parameters according to claim 1, wherein triggering the terminal comprises switching, by the terminal, between subscriber identity modules (SIMs), wherein obtaining the one of the multiple sets of service parameters from the profile data after the terminal is triggered comprises reading, by the terminal, operator's information from a currently used SIM, and obtaining service parameters corresponding to the operator's information from the profile data, and wherein configuring, by the terminal, the service parameters of the terminal comprises configuring service parameters of the currently used SIM.

7. The method for configuring service parameters according to claim 1, wherein triggering the terminal comprises switching, by the terminal, between networking modes, wherein switching between network modes comprises switching between a Time Division-Synchronous Code Division Multiple Access (TD-SCDMA) mode and a Global System for Mobile Communications (GSM) mode, and wherein obtaining the one of the multiple sets of service parameters from the profile data after the terminal is triggered comprises:
using, by the terminal, a subscriber identity module (SIM) corresponding to a current networking mode;
reading operator's information from a current SIM; and
obtaining service parameters corresponding to the networking mode from the profile data according to the operator's information and the current networking mode.

8. The method for configuring service parameters according to claim 7, wherein, after reading the operator's information from the current SIM, the method further comprises reading information about the networking mode and/or a sub-brand from the current SIM, and wherein switching between the network modes comprises the terminal moving along an edge of an area covered by both a TD-SCDMA network and a GSM network.

9. The method for configuring service parameters according to claim 8, wherein the terminal comprises multiple SIMs, wherein the terminal is configured to use one of the multiple different SIMs for the TD-SCDMA network and another one of the multiple different SIMs for the GSM network, and wherein obtaining the one of the multiple sets of the service parameters further comprises:
obtaining the one of the multiple sets of the service parameters corresponding to the networking mode from the profile data according to the information about the networking mode; and/or
obtaining the one of the multiple sets of the service parameters corresponding to the information about the sub-brand from the profile data according to the information about the sub-brand.

10. The method for configuring service parameters according to claim 1, wherein obtaining the one of the multiple sets of the service parameters comprises:
reading, by the terminal, operator's information from a current subscriber identity module (SIM), and obtaining the service parameters from the profile data according to the operator's information or a service type of the service to be performed; or
selecting, by the terminal, service parameters of the service type from the profile data according to the service type of the service to be performed, and using a SIM corresponding to the selected service parameters.

11. The method for configuring service parameters according to claim 1, wherein triggering comprises switching, by the terminal, between subscriber identity modules (SIMs), and wherein obtaining the one of the multiple sets of the service parameters comprises:
reading, by the terminal, operator's information from a current subscriber identity module (SIM); and
obtaining service parameters corresponding to the operator's information from the profile data according to the operator's information.

12. The method for configuring service parameters according to claim 1, wherein triggering comprises switching, by the terminal, between networking modes, and wherein obtaining the one of the multiple sets of the service parameters from the profile data after the terminal is triggered comprises:
using, by the terminal, a subscriber identity module (SIM) corresponding to a current networking mode according to the current networking mode;
reading operator's information from the current SIM; and
obtaining service parameters corresponding to the networking mode from the profile data according to the operator's information and current networking mode.

13. The method for configuring service parameters according to claim 1, wherein the multiple sets of service parameters comprise an operator name parameter, a sub-brand name parameter, a networking mode parameter, an Internet Protocol (IP) address of a proxy gateway, a port number of the proxy gateway, and a uniform resource identifier (URI).

14. The method for configuring service parameters according to claim 1, wherein the terminal is configured to automatically select the one of the multiple sets of service parameters without action from a user.

15. A terminal for configuring service parameters, comprising:
a memory module configured to store profile data in the terminal, wherein the profile data comprises multiple sets of service parameters that correspond to multiple services; and
a configuration module configured to obtain one of the multiple sets of service parameters from the profile data stored in the terminal after the terminal is triggered, and configure the service parameters by using the obtained one of the multiple sets of service parameters, wherein the terminal is triggered by performing one of the multiple services, and wherein the configuration module is configured to select the one of the multiple sets of service parameters from the profile data according to an indication of the one of the multiple services to be performed; and
multiple subscriber identity cards, wherein the configuration module is configured to use one of the multiple subscriber identity cards that corresponds to the selected one of the multiple sets of service parameters, and wherein the multiple sets of service parameters comprise streaming service parameters, multimedia messaging service (MMS) parameters, device management (DM) parameters, browser service parameters, and short message service (SMS) parameters,
wherein the configuration module is configured to automatically select the one of the multiple sets of service parameters according to an operator and a networking mode of the one of the multiple services to be performed,
wherein when concurrent services are received by the terminal with a multi-module under different networking modes, the terminal is further configured to determine whether a client with current service parameters has an ability to support a new service, wherein the concurrent services comprise a current service and the new service, and wherein the new service is received by the client based on a result of the determination.

16. The terminal for configuring service parameters according to claim 15, further comprising:

a transceiver module configured to receive the profile data from a parameter server and provide the profile data to the memory module, and wherein the transceiver module is further configured to send a request for the profile data to the parameter server.

17. The terminal for configuring service parameters according to claim 15, wherein the configuration module further comprises:

a triggering module configured to send a triggering report when the terminal is to perform services, switch between subscriber identity modules (SIMs), or switch between networking modes;

a parameter searching module configured to search the multiple sets of service parameters from the memory module after receiving the triggering report sent by the triggering module, and provide the searched service parameters; and a parameter configuration module configured to receive the service parameters provided by the searching module, and configure the service parameters by using the received service parameters.

18. The terminal for configuring service parameters according to claim 15, wherein the terminal further comprises an information obtaining module configured to obtain operator's information from a subscriber identity module (SIM), and send the operator's information to the configuration module, wherein the configuration module is further configured to receive the operator's information sent by the information obtaining module, and determine the service parameters from the memory module according to the operator's information.

19. The terminal for configuring service parameters according to claim 15, wherein the terminal is configured to automatically select the one of the multiple sets of service parameters without action from a user.

* * * * *